(12) United States Patent
Mitsunobu et al.

(10) Patent No.: US 11,987,863 B2
(45) Date of Patent: May 21, 2024

(54) PLATED STEEL SHEET

(71) Applicant: NIPPON STEEL CORPORATION, Tokyo (JP)

(72) Inventors: Takuya Mitsunobu, Tokyo (JP); Takehiro Takahashi, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/040,903

(22) PCT Filed: Aug. 19, 2021

(86) PCT No.: PCT/JP2021/030398
§ 371 (c)(1),
(2) Date: Feb. 7, 2023

(87) PCT Pub. No.: WO2022/085287
PCT Pub. Date: Apr. 28, 2022

(65) Prior Publication Data
US 2023/0295775 A1  Sep. 21, 2023

(30) Foreign Application Priority Data

Oct. 20, 2020 (JP) .................................. 2020-175786

(51) Int. Cl.
*C22C 18/04* (2006.01)
*B32B 15/01* (2006.01)
(Continued)

(52) U.S. Cl.
CPC ............ *C22C 18/04* (2013.01); *B32B 15/012* (2013.01); *B32B 15/013* (2013.01); *B32B 15/04* (2013.01);
(Continued)

(58) Field of Classification Search
CPC ......... C22C 18/04; C22C 18/00; C22C 38/00; C22C 38/02; C22C 38/04; C22C 38/06;
(Continued)

(56) References Cited

U.S. PATENT DOCUMENTS

| 11,634,790 B2 * | 4/2023 | Mitsunobu ................ C23C 2/40 |
| | | 428/629 |
| 2019/0390303 A1 * | 12/2019 | Tokuda ..................... C23C 2/29 |
| 2021/0198780 A1 | 7/2021 | Mitsunobu |

FOREIGN PATENT DOCUMENTS

| JP | 2006249521 A | 9/2006 |
| JP | 2010-070810 A * | 4/2010 |

(Continued)

OTHER PUBLICATIONS

Machine Translation, Shinichi, JP 2010-070810 A, Apr. 2, 2010. (Year: 2010).*

*Primary Examiner* — Michael E. La Villa
(74) *Attorney, Agent, or Firm* — Renner, Otto, Boisselle & Sklar, LLP

(57) ABSTRACT

A plated steel sheet includes: a steel sheet; and a plating layer that is formed on at least a part of a surface of the steel sheet, in which a chemical composition of the plating layer includes, b mass %, Al: 6.00% to 35.00 %, Mg: 3.00% to 15.00%, La+Ce: 0.0001% to 0.5000% in total, and Zn, and in a surface of the plating layer, the area ratio of a lamellar structure in which an (Al—Zn) phase and a MgZn$_2$ phase are arranged in layers is 10% to 95%, the lamellar spacing of the lamellar structure is 2.5 μm or less, and the area ratio of an (Al—Zn) dendrite is 10% or less.

6 Claims, 2 Drawing Sheets

(51) Int. Cl.
  *B32B 15/04* (2006.01)
  *B32B 15/18* (2006.01)
  *C21D 9/46* (2006.01)
  *C22C 18/00* (2006.01)
  *C22C 21/00* (2006.01)
  *C22C 38/00* (2006.01)
  *C22C 38/02* (2006.01)
  *C22C 38/04* (2006.01)
  *C22C 38/06* (2006.01)
  *C23C 2/02* (2006.01)
  *C23C 2/06* (2006.01)
  *C23C 2/12* (2006.01)
  *C23C 2/26* (2006.01)
  *C23C 2/28* (2006.01)
  *C23C 2/40* (2006.01)
  *C23C 30/00* (2006.01)

(52) U.S. Cl.
  CPC ............ *B32B 15/043* (2013.01); *B32B 15/18* (2013.01); *C21D 9/46* (2013.01); *C22C 18/00* (2013.01); *C22C 21/00* (2013.01); *C22C 38/00* (2013.01); *C22C 38/02* (2013.01); *C22C 38/04* (2013.01); *C22C 38/06* (2013.01); *C23C 2/02* (2013.01); *C23C 2/022* (2022.08); *C23C 2/06* (2013.01); *C23C 2/12* (2013.01); *C23C 2/26* (2013.01); *C23C 2/28* (2013.01); *C23C 2/285* (2013.01); *C23C 2/29* (2022.08); *C23C 2/40* (2013.01); *C23C 30/00* (2013.01); *C23C 30/005* (2013.01); *Y10T 428/1259* (2015.01); *Y10T 428/12667* (2015.01); *Y10T 428/12757* (2015.01); *Y10T 428/12799* (2015.01); *Y10T 428/12958* (2015.01); *Y10T 428/12972* (2015.01); *Y10T 428/2495* (2015.01); *Y10T 428/24967* (2015.01); *Y10T 428/265* (2015.01)

(58) Field of Classification Search
  CPC ..... C22C 21/00; B32B 15/013; B32B 15/012; B32B 15/04; B32B 15/043; B32B 15/18; C23C 2/022; C23C 2/06; C23C 2/26; C23C 2/29; C23C 2/40; C23C 2/02; C23C 2/28; C23C 2/12; C23C 2/285; C23C 30/00; C23C 30/005; Y10T 428/12799; Y10T 428/12757; Y10T 428/12972; Y10T 428/12958; Y10T 428/12667; Y10T 428/1259; Y10T 428/2495; Y10T 428/24967; Y10T 428/265; C21D 9/46
  See application file for complete search history.

(56) References Cited

FOREIGN PATENT DOCUMENTS

| | | | | |
|---|---|---|---|---|
| JP | 4579715 | B2 | 11/2010 | |
| JP | 2015214747 | A | 12/2015 | |
| JP | 6350780 | B1 | 7/2018 | |
| WO | WO-2018139619 | A1 * | 8/2018 | ........... B32B 15/013 |

* cited by examiner

PLATED STEEL SHEET

TECHNICAL FIELD OF THE INVENTION

The present invention relates to a plated steel sheet.

Priority is claimed on Japanese Patent Application No. 2020-175786, filed on Oct. 20, 2020, the content of which is incorporated herein by reference.

RELATED ART

Recently, as a vehicle structural member, a plated steel sheet is used from the viewpoint of antirust, and a hot-dip galvanized steel sheet such as a galvannealed steel sheet is mainly used in the Japanese market. The galvannealed steel sheet is a plated steel sheet in which weldability and post-coating corrosion resistance are improved by performing an alloying heat treatment on a steel sheet after hot-dip galvanizing and diffusing Fe from the steel sheet (base steel sheet) into a plating layer. However, further improvement of corrosion resistance such as post-coating corrosion resistance or red rust resistance is required for the hot-dip galvanized steel sheet.

Examples of a method of improving the corrosion resistance of the hot-dip galvanized steel sheet include addition Al to a Zn-based plating. For example, in the building material field, as a high corrosion resistant plated steel sheet, a hot-dip Al—Zn-based alloy plated steel sheet has been widely put into practice. A plating layer of the hot-dip Al—Zn-based alloy plated steel sheet is formed of: a dendritic α-(Zn,Al) phase that is initially crystallized from a molten state (Al primary phase: α-(Zn,Al) phase crystallized as a primary phase in the Al—Zn binary phase diagram or the like; this phase is not necessarily an Al-rich phase and is crystallized as a solid solution of Zn and Al); and a structure (Zn/Al mixed phase structure) formed of a Zn phase and an Al phase that is formed in a gap of the dendritic Al primary phase. The Al primary phase is passivated, and the Zn/Al mixed phase structure has a higher Zn concentration than the Al primary phase. Therefore, corrosion concentrates on the Zn/Al mixed phase structure. As a result, the corrosion propagates in a worm-eaten state in the Zn/Al mixed phase structure, and a corrosion propagation path is complicated. Therefore, the corrosion is not likely to easily reach the base steel sheet. As a result, the hot-dip Al—Zn-based alloy plated steel sheet has higher corrosion resistance than a hot-dip galvanized steel sheet where a plating layer has the same thickness.

When this hot-dip Al—Zn-based alloy plated steel sheet is used as a vehicle exterior panel, the plated steel sheet is provided to automobile manufacturers and the like in a state where it is plated in a continuous hot-dip plating facility is processed into a panel component shape, and subsequently undergoes automotive general coating of chemical conversion treatment, further electrodeposition coating, intermediate coating, and top coating in general. However, in the exterior panel formed of the hot-dip Al—Zn-based alloy plated steel sheet, when a coating film is damaged, due to the unique plating phase structure formed of the two phases including the Al primary phase and the Zn/Al mixed phase structure, preferential dissolution of Zn (selective corrosion of the Zn/Al mixed phase structure) initiates from a damaged part at an interface between the coating film and the plating. This corrosion propagates deep into a coating defect-free part, severe coating blistering occurs, and thus there is a problem in that sufficient corrosion resistance (post-coating corrosion resistance) cannot be secured.

In order to improve the corrosion resistance, addition of an element such as Mg to the Al—Zn-based plating is also considered. However, it is presumed that, even when Mg is added, an Al primary phase including a passivation film is still formed in the hot-dip Al—Zn-based alloy plated steel sheet. Therefore, the problem of corrosion resistance caused when the coating film is damaged after coating (post-coating corrosion resistance) is not solved.

In order to solve this problem, Patent Document 1 discloses a hot-dip Zn-based plated steel sheet having excellent post-coating corrosion resistance. Patent Document 1 discloses that a plating layer includes Zn, Al, Mg, and Si, and when the total area ratio of a lamellar structure in which a layered Zn phase and a layered Al phase are alternately arranged in the plating layer is 5% or more, coating blistering in the coated state is suppressed.

Patent Document 2 discloses a hot-dip Al—Zn-based alloy plated steel sheet including a plating layer, in which the plating layer includes, by mass %, Al: 25% to 90% and Sn: 0.01% to 10% and further includes 0.01% to 10% of one kind or more selected from the group consisting of Mg, Ca, and Sr. Patent Document 2 discloses that, since an Al oxide film formed around the α-Al phase is fractured by Sn such that the solubility of the α-Al phase increases, uniform corrosion of the plating layer in which the α-Al phase and a Zn-rich phase are dissolved occurs. As a result, selective corrosion of the Zn-rich phase can be suppressed, and post-coating corrosion resistance is improved.

In addition, Patent Document 3 discloses a chemical conversion steel sheet including, as a substrate, a hot-dip Zn—Al—Mg alloy plated steel sheet where the proportion of [Al/Zn/$Zn_2$Mg ternary eutectic structure] in an outermost surface of a plating layer is 60 area % or more, in which face of the plating layer is covered with a chemical conversion film.

In addition, Patent Document 4 discloses a zinc-based alloy plated steel sheet including: Al: 0.18% to 5%; one kind or two or more kinds among Mg: 0.01% to 0.5%, La: 0.001% to 0.5%, and Ce: 0.001% to 0.5%; and a remainder consisting of a Zn—Al-based alloy plating formed of Zn. Patent Document 4 discloses that a zinc-based alloy plating such as a Zn—Al—Mg-based plating or a Zn—Al—Mg—Si-based plating has higher corrosion resistance than a Zn-based plating in the related art.

A component for a vehicle may be used in an environment were water accumulates and is required to have sufficient corrosion resistance even in this harsh environment. As a result of an investigation by the present inventors, it was found that a Zn—Al—Mg-based plating including a predetermined amount or more of Al has excellent sacrificial protection but has a problem in post-coating corrosion resistance in that coating film peeling is likely to occur in the environment where water accumulates. However, Patent Documents 1 to 4 do not consider the post-coating corrosion resistance in the harsh environment.

In addition, in the technique disclosed in Patent Document 1, it is necessary to perform a complex thermal history process for microstructure control, and there is also a problem in that manufacturing costs increase.

In addition, in the plated steel sheet disclosed in Patent Document 2, adhesion with an electrodeposition film for a vehicle is poor. In addition, in Patent Document 2, Sn addition is essential. Therefore, alloy costs increase, and there is also a problem in that it is difficult to manage a plating bath.

In addition, in Patent Document 3, corrosion resistance is improved by controlling a configuration of the chemical conversion film. In addition, in order to improve the reactivity of the chemical conversion film, the Al/Zn/Zn$_2$ternary eutectic structure is set as a primary phase in the plating layer. Therefore, it is presumed that, when a typical chemical conversion treatment is performed, chemical convertibility is improved but post-coating corrosion resistance cannot be sufficiently obtained.

Accordingly, in the related art, a hot-dip zinc-based plated steel sheet that can secure sufficient post-coating corrosion resistance required for a recent vehicle structural member disclosed.

PRIOR ART DOCUMENT

Patent Document

[Patent Document 1] Japanese Patent No. 6350780
[Patent Document 2] Japanese Unexamined Patent Application, First Publication No. 2015-214747
[Patent Document 3] Japanese Patent No. 4579715
[Patent Document 4] Japanese Unexamined Patent Application, First Publication No. 2006-249521

DISCLOSURE OF THE INVENTION

Problems to be Solved by the Invention

The present invention has been made in consideration of the above-described problems. An object of the present invention is to provide a plated steel sheet having excellent post-coating corrosion resistance on the premise of a hot-dip zinc-based plated steel sheet.

Means for Solving the Problem

The present inventors conducted an investigation in order to improve post-coating corrosion resistance in a steel sheet (Zn—Al—Mg alloy plated steel sheet) that includes a plating layer including Al, Mg, and Zn.

As a result, it was newly found that post-coating corrosion resistance is improved by including La and/or Ce in the plating layer to control a plating structure in a surface of the plating layer. Specifically, it was found that post-coating corrosion resistance is improved by increasing the area ratio of a lamellar structure of an (Al—Zn) phase and a MgZn$_2$ phase and decreasing the area ratio of an (Al—Zn) dendrite in the surface of the plating layer.

The present invention has been made based on the above findings, and the scope thereof is as follows.

[1] According to one aspect of the present invention, there is provided a plated steel sheet including: a steel sheet; and a plating layer that is formed on at least as part of a surface of the steel sheet, in which a chemical composition of the plating layer includes, by mass %, Al: 6.00% to 35.00%, Mg: 3.00% to 15.00%, La+Ce: 0.0001% to 0.5.000% in total, Si: 0% to 2.00%, Ca: 0% to 2.00%, Fe: 0% to 2.00%, Sb: 0% to 0.50%. Sr: 0% to 0.50%, Pb: 0% to 0.50%, Sn: 0% to 1.00%. Cu: 0% to 1.00%, Ti: 0% to 1.00%, Ni: 0% to 1.00%, Ma: 0% to 1.00%, and a remainder of Zn and impurities, and in a surface of the plating layer, the area ratio of a lamellar structure in which an (Al—Zn) phase and a MgZn$_2$ phase are arranged in layers is 10% to 95%, the lamellar spacing of the lamellar structure is 2.5 μm or less, and the area ratio of a (Al—Zn) dendrite is 10% or less.

[2] in the plated steel sheet according to [1], the chemical composition of the plating layer may include, by mass %, one or more kinds among Al: 11.00% to 30.00%, Mg: 5.00% to 11.00%, and La+Ce: 0.0010% to 0.1000% in total.

[3] In the plated steer sheet according to [1] or [2], in the surface of the plating layer, the area ratio of the lamellar structure may be 60% to 95%.

[4] In the plated steel sheet according to [3], in the surface of the plating the area ratio of the lamellar structure may be 80% to 95%.

Effects of the Invention

According to the aspect of the present invention, a plated steel sheet having excellent post-coating corrosion resistance can be provided.

EMBODIMENTS OF THE INVENTION

Figure 1:
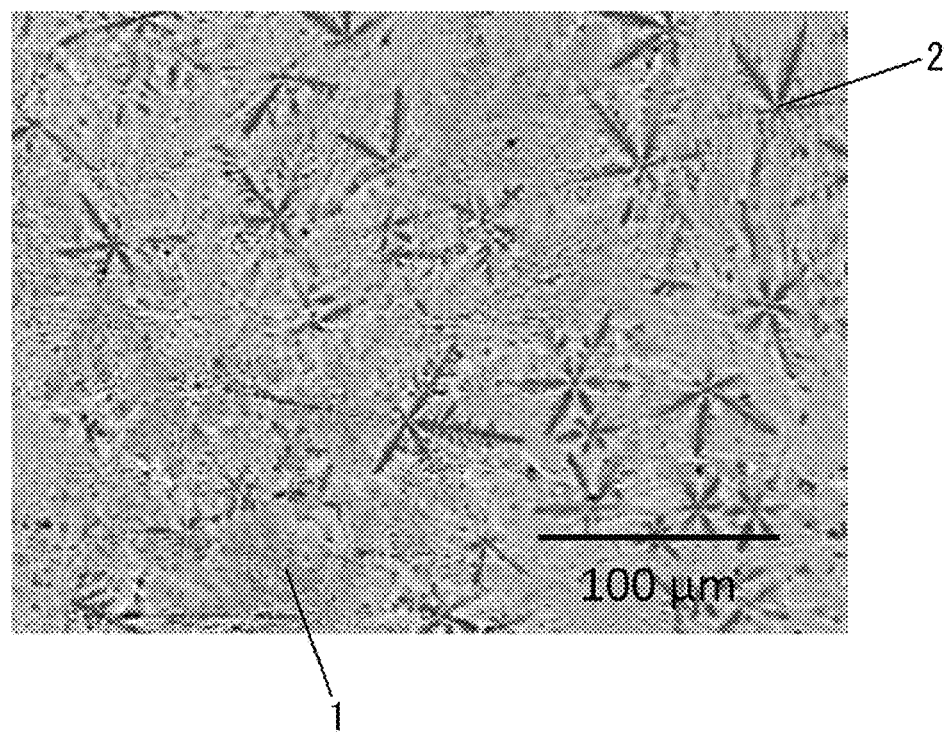
FIG. 1 is a structure image showing a surface of a plating layer of No. 23 according to Comparative Example.

A plated steel sheet according to one embodiment of the present invert on (plated steel sheet according to the embodiment) includes: a steel sheet; and a plating layer that is formed on at least a part of a surface of the steel sheet. In addition, in the plated steel sheet according to the embodiment, a chemical composition of the plating layer includes, by mass %, Al: 6.00% to 35.00%, Mg: 3.00% to 15.00%, La+Ce: 0.0001% to 0.5000%. in total, Si: 0% to 2.00% Ca: 0% to 2.00%, Fe: 0% to 2.00%, Sb: 0% to 0.50%, Sr: 0% to 0.50%, Pb: 0% to 0.50%, Sn: 0% to 1.00%, Cu: 0% to 1.00%, Ti: 0% to 1.00%, Ni: 0% to 1.00%, Mn: 0% to 1:00% at a remainder of Zn and impurities. In addition, in a surface of the plating layer of the plated steel sheet according to the embodiment, the area ratio of a lamellar structure in which an (Al—Zn) phase and a MgZn$_2$ phase are arranged in layers is 10% to 95%, the lamellar spacing of the lamellar structure is 2.5 μm or less, and the area ratio of an (Al—Zn) dendrite is 10% or less.

<Steel Sheet>

In the plated steel sheet according to the embodiment, the plating layer is important, and the kind of the steel sheet is not particularly limited. The kind of the steel sheet may be determined depending on the product to be applied and the strength, sheet thickness, and the like that are required. For example, hot-rolled steel sheet defined in JIS G3193:2008 or a cold-rolled steel sheet defined in JIS G3141:2017 can be used.

<Plating Layer>

In the plated steel sheet according to the embodiment, the plating layer is provided on at least apart of the surface of the steel sheet. The plating layer may be formed on a single surface or both surfaces of the steel sheet.

The adhesion amount of the plating layer is preferably 15 g/m$^2$ to 250 g/m$^2$.

Chemical Composition

The chemical composition of the plating layer in the plated steel sheet according to the embodiment will be described. "%" representing the amount of each element represents "mass %". In addition, a numerical range that interposes "to" includes values at opposite ends thereof as upper and lower limits.

Al: 6.00% to 35.00%

Al is an element that is effective fix securing post-coating corrosion resistance in the plating layer including aluminum (Al), zinc (Zn), and magnesium (Mg). In addition, Al is an element necessary to form the lamellar structure in the plating layer of the plated steel sheet, according to the embodiment. In addition, Al is an element that contributes to the formation of the alloy layer (Al—Fe alloy layer) and is effective for securing plating adhesion. In order to sufficiently obtain the effect, the Al content is 6.00% or more. The Al content is preferably 11.00% or more.

On the other hand, when the Al content is more than 35.00%, the area ratio of the (Al—Zn) dendrite increases, and the post-coating corrosion resistance and the corrosion resistance of a cut end surface of the plating layer deteriorate. Therefore, the Al content is 35.00% or less. The Al content, is preferably 30.00% or less.

Mg: 3.00% to 15.00%

Mg is an element having an effect of improving the post-coating corrosion resistance of the plating layer. In addition, Mg is an element necessary to form the lamellar structure in the plating layer of the plated steel sheet according to the embodiment. In order to sufficiently obtain the effect, the Mg content is 3.00% or more. The Mg content is preferably 5.00% or more.

On the other hand, when the Mg content is more than 15.00%, the lamellar structure is not sufficiently formed, post-coating corrosion resistance deteriorates, and the workability of the plating layer deteriorates. In addition, there is a manufacturing problem in that, for example, the amount of dross formed in a plating bath increases. Therefore, the Mg content is 15.00% or less. The Mg content is preferably 11.00% or less.

La+Ce: 0.0001% to 0.5000% in Total

La and Ce are elements that are effective for stabilizing the lamellar structure in the plating layer. The lamellar structure can be formed in a region other than a surface layer area in the plating layer even without including La and Ce in the plating layer. However, when the total amount of La and Ce is less than 0.0001%, the lamellar structure is not formed in the surface layer area. Therefore, the area ratio of the lamellar structure in the surface of the plating layer cannot be sufficiently secured.

On the other hand, Shen the total amount of La and Ce is more than 0.5000%, the viscosity of the plating bath increases, it is difficult to prepare the plating bath in many cases, and plated steel having excellent plating characteristics cannot be manufactured. Therefore, the total, amount of La and Ce is preferably 0.5000% or less.

Si: 0% to 2.00%

Si is an element that forms a compound together with Mg and contributes to improvement of post-coating corrosion resistance. In addition, Si is an element having an effect of improving adhesion between the steel sheet and the plating layer by suppressing the formation of an excessively thick alloy layer between the steel sheet and the plating layer when the plating layer is formed on the steel sheet. Therefore, Si may be included. In order to obtain the effect, the Si content is preferably 0.10% or more. The Si content s more preferably 0.20% or more.

On the other hand, when the Si content is more than 2.00%, an excess amount of Si is crystallized in the plating layer, the lamellar structure is not sufficiently formed, and post-coating corrosion resistance deteriorates. In addition, the workability of the plating layer also deteriorates. Accordingly, the Si content is 2.00% or less. The Si content is mora preferably 1.50% or less. Si does not need to be included, and the lower limit of the content is 0%.

Ca: 0% to 2.00%

When is included in the plating layer, the amount of dross that is more likely to be formed during a plating operation along with an increase in Mg content decreases, and plating manufacturability is improved. Therefore, Ca may be included. Ca does not need to be included, and the lower limit thereof is 0%. In order to obtain the effect, the Ca content is preferably 0.03% or more and more preferably 0.10% or more.

On the other hand, when the Ca content is high, the lamellar structure is not sufficiently formed, the area ratio of Ca-based intermetallic compounds including a $CaZn_{11}$ phase formed as other intermetallic compound phases is 10% or more, and post-coating corrosion resistance deteriorates. In addition, the post-coating corrosion resistance of a flat portion of the plating layer itself tends to deteriorate, and the corrosion resistance of the vicinity of a welded part may also deteriorate. Therefore, the Ca content is 2.00% or less. The Ca content is preferably 1.00% or less.

Fe: 0% to 2.00%

Fe is incorporated into the plating layer as an impurity when the plating layer is manufactured. About up to 2.00% of Fe may be included. When the Fe content is in this range, there is little adverse effect on characteristics of the plated steel sheet according to the embodiment. Therefore, the Fe content is preferably 2.00% or less. The Fe content is more preferably 1.50% or less and still more preferably 1.00% or less.

On the other hand, as described above, Fe is incorporated into the plating layer as an impurity. A significant high cost is required to completely prevent the incorporation of Fe. Therefore, the Fe content may be 0.10% or more.

The chemical composition of the plating layer in the plated steel sheet according to the embodiment basically includes the above-described chemical composition and a remainder consisting of Zn and impurities. The amount of the purities is preferably 5.0% or less and more preferably 3.0% or less.

However, the plating layer in the plated steel sheet according to the embodiment may further include, for example, Sb, Pb, Cu, Sn, Ti, Sr, Ni, and Mn in the following ranges instead of a part of Zn (whether the elements are added on purpose or are included as impurities does not matter). Since these elements do not need to be included, the lower limit of the amount of each of the elements is 0%,.

Sb: 0% to 0.50%
Sr: 0% to 0.50%
Pb: 0% to 0.50%

When Sr, Sb, and Pb are included in the plating layer, the external appearance of the plating layer changes, spangle is formed, and improvement of metallic gloss is verified. Therefore, Sr, Sb, and Pb may be included. In order to obtain the effect, it is preferable that 0.01% or more of one or more kinds among Sb, Sr, and Pb is included. On the other hand, when the amount of each of these elements is more than 0.50%, various intermetallic compound phases are formed, and workability and corrosion resistance deteriorate. In addition, when the amount of each of these elements is excessive, the viscosity of the plating bath increases, it is difficult to prepare the plating bath in any cases, and a plated steel sheet having excellent plating characteristics cannot be manufactured. Therefore, it is preferable that the Sr content is 0.50% or less, the Sb content is 0.50% or less, and the Pb content is 0.50% or less.

Sn: 0% to 1.00%

Sn is an element that increases a Mg dissolution rate in the plating layer including Zn, Al, and Mg. When the Mg dissolution rate increases, flat portion corrosion resistance deteriorates. Therefore, the Sn content is preferably 1.00% or less.

Cu: 0% to 1.00%
Ti: 0% to 1.00%
Ni: 0% to 1.00%
Mn: 0% to 1.00%

These elements are elements contributing to improvement of corrosion resistance. Therefore, the elements may be included. In order to obtain the effect, the amount of one or more kinds of Cu, Ni, Ti, and Mn is preferably 0.01% or more. On the other hand, when the amount of each of these elements is excessive, the viscosity of the plating bath increases, it is difficult to prepare the plating bath in many cases, and a plated steel sheet having excellent plating characteristics cannot be manufactured. Therefore, the amount of each of the elements is preferably 1.00% or less.

The chemical composition of the plating layer is measured using the following method.

First, an acid solution is obtained by peeling and dissolving the plating layer with an acid including an inhibitor that suppresses the corrosion of the base metal (steel). Next, by measuring the obtained acid solution by ICP analysis, the chemical composition the platting layer can be obtained. The kind of the acid is not particularly limited as long as it is an acid that can dissolve the plating layer. The chemical composition s measured as an average chemical composition.

Structures (Phases) in Plating Layer

Figure 2:
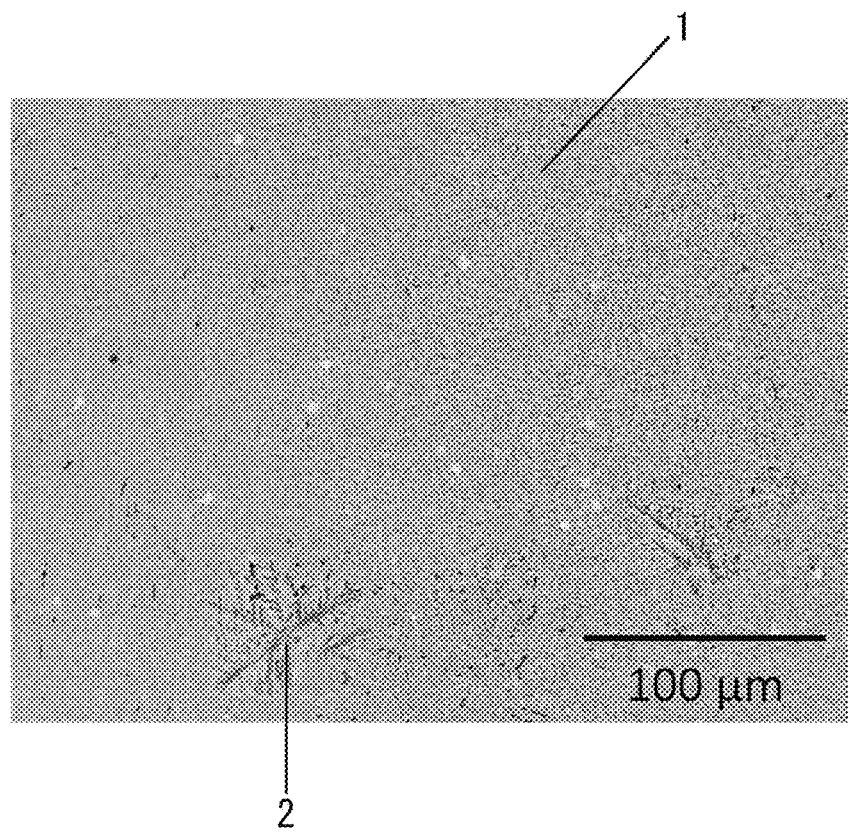
FIG. 2. is a structure image showing a surface of a plating layer of No. 19 according to Invention Example.

In the surface of the plating layer in the plated steel sheet according to the embodiment, for example, as shown in FIG. 2, the lamellar structure in which the (Al—Zn) phase and the $MgZn_2$ phase are arranged in layers is provided, and the area ratio of the lamellar structure is 10% to 95%. In addition, in the surface Of the plating layer of the plated steel sheet according to the embodiment, the area ratio of the (Al—Zn) dendrite is 10% or less (for comparison, FIG. 1 shows a stricture image in a surface of a plating layer of a plated steel sheet in the related art).

in general, when the steel sheet dipped in the plating bath including Zn, Mg, and Al is cooled, the (Al—Zn) dendrite as a primary phase and the $Zn/Al/Al/MgZn_2$ ternary eutectic structure are formed in the plating layer. The (Al—Zn) dendrite has low corrosion resistance. Therefore, even in a case where the steel sheet is coated, for example, when defects occur in the coating film, corrosion propagates into the plating layer and coating blistering occurs. On the other hand, when the corrosion resistance of the surface of the plating layer is high, even in a case where defects occur in the coating film, the propagation of corrosion in the surface of the plating layer can be suppressed. As a result of the investigation by the present inventors, it was found that the lamellar structure in which the (Al—Zn) phase and the $MgZn_2$ phase are arranged in layers has high corrosion resistance and the corrosion resistance is improved by forming the lamellar structure in which the (Al—Zn) phase and the $MgZn_2$ phase are arranged in layers in the surface at a predetermined area ratio or more.

Therefore, in the plating layer of the plated steel sheet according to the embodiment, the area ratio of the lamellar structure in which the (Al—Zn) phase and the $MgZn_2$ phase are arranged in layers in the surface of the plating layer is 10% or more, the lamellar structure contributing to improvement of post-coating corrosion resistance. The area ratio of the lamellar Structure in the surface, is preferably 60% or more and more preferably 80% or more. The lamellar structure has an effect of improving not only post-coating corrosion resistance but also LME resistance.

On the other hand, under the pre-condition of the above-described chemical composition, it is difficult to adjust the area ratio of the lamellar structure to be more than 95% from the viewpoint of industrial application. Therefore, the area ratio of the lamellar structure is 95% or less.

In addition, in the surface of the plating layer of the plated steel sheet according to the embodiment, the area ratio of the (Al—Zn) dendrite that deteriorates post-coating corrosion resistance is 10% or less. The area ratio of the (Al—Zn) dendrite is preferably as small as possible and may be 0%.

Figure 3:
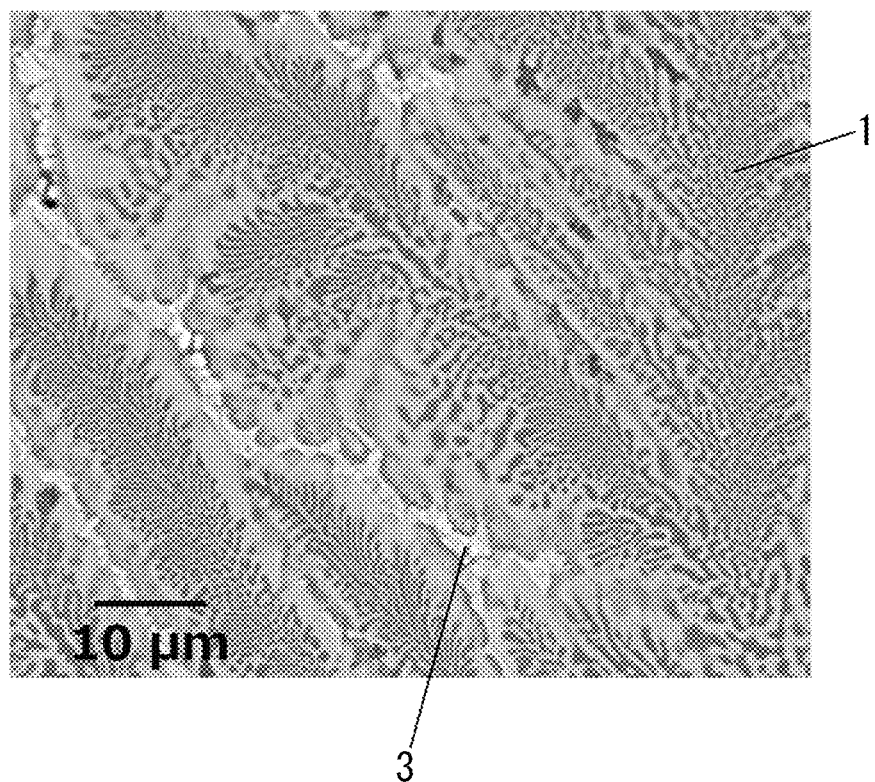
FIG. 3 is a structure image showing the surface of the plating layer of No. 19 according to Invention Example.

In the lamellar structure, the (Al—Zn) phase and the $MgZn_2$ phase are arranged in layers, for example, as shown FIG. 3. As the lamellar spacing of the lamellar structure decreases, the effect of improving post-coating corrosion resistance and LME resistance increases. The lamellar spacing for obtaining sufficient performance is 2.5 μm or less (2500 nm or less) and preferably 500 nm or less. This lamellar structure is also called a "feathery structure".

The $Zn/Al/MgZn_2$ ternary eutectic structure includes, b area %, Zn phase: 45% to 60%, $MgZn_2$ phase; 35% to 45%, and Al phase: 3% to 10%. On the other hand, the fractions of the respective phases in the lamellar structure include, by area %, Zn phase: 0% to 10%, $MgZn_2$ phase: 40% to 65%, and Al phase: 30% to 45%.

The plating layer in the plated steel sheet according to the embodiment may include, in the surface, a massive $MgZn_2$ phase, the $Zn/Al/MgZn_2$ ternary eutectic structure, and other intermetallic compounds as phases other than the lamellar structure and the (Al—Zn) dendrite described above. The total amount of the remainder is preferably 50% or less and more preferably 10% or less.

The massive $MgZn_2$ phase contributes to improvement of post-coating corrosion resistance. In order to sufficiently obtain the effect, the area ratio of the massive $MgZn_2$ phase is preferably 5% or more. On the other hand, from the viewpoint of workability, the area ratio of the $MgZn_2$ phase is preferably 40% or less.

The area ratio of the $Zn/Al/MgZn_2$ ternary eutectic structure is preferably 45% or less. When the area ratio of the $Zn/Al/MgZn_2$ ternary eutectic structure is more than 45%, post-coating corrosion resistance may deteriorate.

In addition, the $MgSi_2$ phase or other intermetallic compounds deteriorate post-coating corrosion resistance. Therefore, the area ratio of each of the $MgSi_2$ phase or other intermetallic compounds is preferably 10.0% or less. The total area ratio is more preferably 10.0% or less. Examples of the other intermetallic compound phases include a $CaZn_{11}$ phase, an $Al_2CaSi_2$ phase, and an $Al_2CaZn_2$ phase.

The structures of the plating layer (the area ratios of the respective phases, the lamellar spacing) are measured Using the following method.

A sample having a size of 25 mm in a direction perpendicular to a rolling direction and 1.5 mm in the rolling direction is collected from the plated steel sheet according to the embodiment, and this sample is embedded in a resin and polished such that the surface of the plating layer of the sample is an observed section. Next, a SEM image and an element distribution image by EDS are obtained. Regarding the area ratios of the lamellar structure, the massive $MgZn_2$ phase, the Zn/Al/MgZn$_2$ ternary eutectic structure, the (Al—Zn) dendrite, the other intermetallic compounds in the plating layer, one visual held is imaged from each of five samples having different cross sectional EDS mapping images of the plating layers, that is, five visual fields (magnification: 1500-fold, 60 μm×50 μm/One Visual Field) in total are imaged, and the area ratio of each of the structures is calculated by image analysis.

At this time, when an (Al—Zn) phase formed of Al and Zn and a MgZn$_2$ phase are arranged in layers and the lamellar spacing therebetween is 4 μm or less, this structure is determined as the lamellar structure. Even in a case where the (Al—Zn) phase and the MgZn$_2$ phase are adjacent to each other, when the minor axis of the (Al—Zn) phase or the MgZn$_2$ phase is more than 4 μm, these structures are determined as the (Al—Zn) dendrite and the massive MgZn$_2$ phase, respectively. A lamellar structure of a Zn phase, an a phase, and MgZn$_2$ having a lamellar spacing of 4 μm or less is determined as the Zn/Al/MgZn$_2$ ternary eutectic structure. When 10% or more of metals other than (Zn, Al, Mg, Si) are included in the phase, the structure is determined as the other intermetallic compound.

In addition, the lamellar spacing of the lamellar structure is obtained by measuring the spacing between a phase having the smallest area ratio and a phase adjacent thereto among phases forming the lamellar structure in the SEM observation and calculating the average value of spacings measured at 10 positions.

In addition, the area ratios of the Zn phase, the MgZn$_2$ phase, and the Al phase forming the lamellar structure and the Zn/Al/MgZn$_2$ ternary eutectic structure can be obtained using a method in which a region where the corresponding structure is present on the cross sectional SEM image is surrounded by a line using image processing software or the like to calculate the area of the region surrounded by the line.

<Manufacturing Method>

Next, a preferable method for manufacturing the plated steel sheet according to the embodiment will be described. As long as the plated steel sheet according to the embodiment has the above-described characteristics, the effects can be obtained irrespective of the manufacturing method. However, with the following method, the steel sheet can be stably manufactured, which is preferable.

Specifically, the steel sheet according to the embodiment can be manufactured with a manufacturing method including the following processes (I) to (IV).

(I) An annealing process of performing reduction annealing on the steel sheet (II) A plating process, of dipping be steel sheet in a plating bath including Al, Mg, Zn, and one kind or two kinds of La and Ce to prepare a plated base sheet (III) A controlled cooling process of cooling the plated base sheet to a cooling stop temperature which is from (Al—Zn/MgZn$_2$ binary eutectic temperature −30)° C. to (Al—Zn/MgZn$_2$ binary eutectic temperature −10)° C. at an average cooling rate of 15°0 C./sec or faster (IV) A slow cooling process of cooling the plated steel sheet to 335° C. or lower after the controlled cooling process such that an average cooling rate to 335° C. is 5° C./sec or slower Annealing Process In the annealing process, a steel sheet (hot-rolled steel sheet car cold-rolled steel sheet) obtained using a well-known method is annealed (reduction annealing) before the plating process. Annealing conditions may be well-known conditions. For example, the steel sheet is heated to 750° C. to 900° C. in a 5% H$_2$—N$_2$ gas atmosphere having a dew point of −10° C., or higher and is held at this state for 30 seconds to 240 seconds.

Plating Process

In the plating process in the process of temperature decrease after annealing, the steel sheet is dipped in the plating bath to form the plating layer. As a result, the plated base sheet is formed.

It is preferable that the plating bath includes, by mass %, Al: 6.00% to 35.00%, Mg: 3.00% to 15.00%, La+Ce: 0.0001% to 0.5000%, Si: 0% to 2.00%, Ca: 0% to 2.00%, and a remainder consisting of Zn and impurities. Further, Fe, Sb, Sr, Pb, Sn, Cu, Ti, Ni, and Mn may be optionally included. The composition of the plating bath is substantially the same as the composition of the plating layer to be formed, and thus may be adjusted according to the chemical composition of the plating layer that is desired to be obtained.

Controlled Cooling Process

In the controlled cooling process, the plated base sheet after the plating process (the plated base sheet that is pulled from the plating bath) is cooled after adjusting the plating adhesion amount by wiping gas such as N$_2$. During the cooling, the plated base sheet is cooled to a cooling stop temperature which is from (Al—Zn/MgZn$_2$ binary eutectic temperature −30)° C. to (Al—Zn/MgZn$_2$ binary eutectic temperature −10)° C. such that an average cooling rate is 15° C./sec or faster.

By performing the cooling under the above-described conditions, the formation of the (Al—Zn) dendrite is suppressed, a product nucleus of the lamellar structure is formed, and the lamellar structure is formed in the next slow cooling process.

When the average cooling rate is slower than 15° C./sec, the (Al—Zn) phase and the MgZn$_2$ phase do not form the lamellar structure, a large amount of the (Al—Zn) dendrite is formed, and post-coating corrosion resistance deteriorates.

In addition, when the cooling stop temperature is lower than (Al—Zn/MgZn$_2$ binary eutectic temperature −30)° C., it is difficult to form a sufficient amount of the lamellar structure in the next slow cooling process. In addition when the cooling stop temperature is higher than (Al—Zn/MgZn$_2$ binary eutectic temperature −10)° C., the phase and the MgZn$_2$ phase cannot satisfy conditions of eutectic solidification, and thus a large amount of an (Al—Mg) dendrite is formed.

The upper limit of the average cooling rate does not need to be limited, but the average cooling rate ma be 40° C./sec or slower due to restrictions in facility or the like.

The Al—Zn/MgZn$_2$ binary eutectic temperature can be obtained from, for example, a liquidus projection of Zn—Al—Mg ternary phase diagram.

Slot Cooling Process

In the slow cooling process, the plated base sheet after stopping the controlled cooling is cooled to 335° C. or lower such that the average cooling rate to 335° C. is 5° C./sec or slower.

In this slow cooling process, the product nucleus of the lamellar structure formed in the controlled cooling process grows, and a predetermined area ratio of the lamellar structure in the surface is obtained.

When the average cooling 335° C. is faster than 5° C./sec, the nucleus growth is insufficient and the area ratio of the lamellar structure is insufficient.

With the above-described manufacturing method, the plated steels sheet according to the embodiment can be obtained.

EXAMPLES

As a steel sheet provided for annealing and plating, a cold-rolled steel sheet (0.2% C-2.0% Si-2.3% Mn) having a sheet thickness of 1.6 mm was prepared.

This steel sheet was cut into 100 mm×200 mm, and subsequently annealing and hot-dip plating were performed using a batch type hot-dip plating test apparatus.

During the annealing, in a furnace having an oxygen concentration of 20 ppm or lower, annealing was performed at 860° C. for 120 seconds in an atmosphere formed of gas, including 5% of $H_2$ gas and a remainder of $N_2$ and having a dew point of 0° C.

After the annealing, the steel sheet was air-cooled with $N_2$ gas such that the steel sheet temperature reached the bath temperature +20° C., and was dipped in the plating bath having a bath temperature shown in Table 1 for about 3 seconds.

In the plated base sheet where the plating layer was formed, the plating adhesion amount was adjusted to 40 g/m² to 80 g/m² with $N_2$ gas, and the plated base sheet was cooled to room temperature by controlled cooling and slow cooling under conditions shown in Table 2. All of the controlled cooling stop temperatures were in a range of (Al—Zn/MgZn$_2$ binary eutectic temperature −30)° C. to (Al—Zn/MgZn$_2$ binary eutectic temperature −10)° C.

The temperature of the steel sheet was measured using a thermocouple spot-welded to a central part of the plated base sheet.

The composition of the formed plating layer was shown in Table 1. The remainder of Table 1 consisted of Zn and 5.0% or less of impurities.

Regarding the obtained plated steel sheet, the area ratios of the respective phases in the plating layer and the lamellar spacing of the lamellar structure were measured using the following method.

A sample having a size of 2.5 mm in a direction perpendicular to a rolling direction and 15 mm in the rolling direction was collected from the obtained plated steel sheet, and this ample was embedded in a resin and polished such that the surface of the plating layer of the sample was an observed section, Next, an SEM image acid an element distribution image by EDS were obtained. Regarding the area ratios of the lamellar structure, the massive MgZn$_2$ phase, the Zn/Al/MgZn$_2$ ternary eutectic structure, the (Al—Zn) dendrite, the other intermetallic compounds in the plating layer, one visual field was imaged from each of five samples having different cross sectional EDS mapping images of the plating layers, that is, five visual fields (magnification: 1500-fold, 60 μm×50 μm/One Visual Field) in total were imaged, and the area ratio of each of the structures was calculated by image analysis.

In addition, the lamellar spacing of the lamellar structure was obtained by measuring the spacing between a phase having the smallest area ratio and a phase adjacent thereto among phases forming the lamellar structure in the SEM observation and calculating the average value of spacings measured at 10 positions.

The lamellar structure was a structure including, by area %, Zn phase: 0% to 1.0%, MgZn$_2$ phase: 40% to 65%, and Al phase: 30% to 45%.

Next, the obtained plated steel sheet was evaluated for post-coating corrosion resistance.

Specifically, a sample of 50 mm×100 mm s collected from the plated steel sheet, and a zinc phosphating process (SD5350 system, manufactured by Nippon Paint Industrial Coatings Co., Ltd.) was performed thereon. Next, electrodeposition coating (PN110 POWERNICS (registered tradename) GREY, manufactured by Nippon Paint Industrial Coatings Co., Ltd.) having a thickness of 20 μm was formed and was baked at a baking temperature of 150° C. for 20 minutes. Next, the steel sheet was provided for V-bending using a die having an angle of 60° and a radius curvature of 10 mm, was unbent, and was dipped in a 5% NaAl aqueous solution at 50° C. for 500 hours. A tape peeling test of attaching an adhesive tape to only the surface on which the V-bending was performed and peeling off the adhesive tape instantaneously was performed, a ratio of the area where the coating was peeled off to the area where the adhesive tape was attached was obtained, and the obtained ratio was evaluated as follows.

(Evaluation)

B: the peeled area ratio was 25% or more

A: the peeled area ratio as 15% or more and less than 25%

AA: the peeled area ratio was 10% or more and less than 15%

AAA: the peeled area ratio was less than 10%

In addition, the obtained steel sheet was spot-welded under the following conditions, a cross section of a welded part was observed, and the lengths of cracks (LME cracks) were evaluated.

That is, two plated steel sheets of each of Nos. 1 to 30 shown in the table were laminated, a current-carrying electrode was pressed against the sheets such that an electrode angle was 7° and the load was 400 kgf, a current pattern was set such that a nugget diameter was 3.5×√t to 5.5×√t (t: sheet thickness), and spot welding was performed. As the current-carrying electrode, a DR6φ type Cu—Cr electrode according to JIS standards was used.

After the spot welding, e steel sheet was cut its a sheet thickness direction parallel to the direction where the electrode angle was provided. After the cutting, the cross section of the welded part that was mirror-finished by mechanical polishing and chemical polishing was observed with an optical microscope, and the LME crack length of a portion outside a corona bond as measured.

Whether or not cracks were present was determined as follows.

(Evaluation)

A: cracks having a length of 0.3 mm or less were present

AA: no cracks were present

The results are shown in Table 2.

TABLE 1

| | | \multicolumn{10}{c|}{Plating Layer Components (mass %), Remainder Consisting of Zn and Impurities} |
|---|---|---|---|---|---|---|---|---|---|---|---|
| | | | | | | | \multicolumn{3}{c|}{La, Ce} | \multicolumn{2}{c|}{Other Elements} |
| Classification | No. | Al | Mg | Si | Ca | Fe | La | Ce | Total | Kind | Content |
| Comparative Example | 1 | 5.00 | 3.00 | 0.20 | 0.20 | 0.10 | 0.0001 | 0.0003 | 0.0004 | — | 0.00 |
| Invention Example | 2 | 6.00 | 3.00 | 0.20 | 0.20 | 0.20 | 0.0042 | 0.0010 | 0.0052 | Ni: 0.10 | 0.10 |
| Invention Example | 3 | 10.00 | 5.00 | 0.10 | 0.00 | 0.10 | 0.0042 | 0.0060 | 0.0102 | — | 0.00 |
| Comparative Example | 4 | 10.00 | 1.00 | 0.10 | 0.00 | 0.10 | 0.0042 | 0.0010 | 0.0052 | — | 0.00 |
| Invention Example | 5 | 10.00 | 5.00 | 1.00 | 0.00 | 0.10 | 0.0042 | 0.0020 | 0.0062 | Sb: 0.05 | 0.05 |
| Comparative Example | 6 | 11.00 | 3.00 | 0.00 | 0.20 | 0.10 | 0.0042 | 0.0030 | 0.0072 | — | 0.00 |
| Invention Example | 7 | 12.00 | 5.00 | 1.50 | 0.00 | 0.10 | 0.0060 | 0.0010 | 0.0070 | — | 0.00 |
| Invention Example | 8 | 12.00 | 5.00 | 1.50 | 0.00 | 0.10 | 0.00005 | 0.00005 | 0.0001 | — | 0.00 |
| Invention Example | 9 | 14.00 | 5.00 | 0.10 | 0.00 | 0.20 | 0.0042 | 0.0040 | 0.0082 | Mn: 0.20 | 0.20 |
| Invention Example | 10 | 16.00 | 15.00 | 0.10 | 0.60 | 0.10 | 0.0060 | 0.0000 | 0.0060 | — | 0.00 |
| Comparative Example | 11 | 16.00 | 18.00 | 0.10 | 0.00 | 0.10 | 0.0042 | 0.0040 | 0.0082 | — | 0.00 |
| Invention Example | 12 | 18.00 | 7.00 | 0.10 | 0.20 | 0.10 | 0.0060 | 0.0010 | 0.0070 | — | 0.00 |
| Invention Example | 13 | 18.00 | 3.00 | 0.10 | 0.00 | 0.10 | 0.0042 | 0.0030 | 0.0072 | — | 0.00 |
| Invention Example | 14 | 18.00 | 3.00 | 0.10 | 0.00 | 0.10 | 0.0001 | 0.0000 | 0.0001 | — | 0.00 |
| Invention Example | 15 | 18.00 | 7.50 | 0.10 | 0.20 | 0.10 | 0.0060 | 0.0100 | 0.0160 | Ti: 0.01 | 0.01 |
| Invention Example | 16 | 18.00 | 15.00 | 0.10 | 0.20 | 0.20 | 0.0060 | 0.0100 | 0.0160 | — | 0.00 |
| Invention Example | 17 | 20.00 | 3.00 | 0.10 | 0.20 | 0.10 | 0.4000 | 0.1000 | 0.5000 | — | 0.00 |
| Comparative Example | 18 | 20.00 | 5.00 | 0.00 | 0.20 | 0.30 | 0.0000 | 0.0000 | 0.0000 | — | 0.00 |
| Invention Example | 19 | 20.00 | 7.50 | 0.10 | 0.05 | 0.30 | 0.0100 | 0.0200 | 0.0300 | Pb: 0.02 | 0.02 |
| Invention Example | 20 | 20.00 | 15.00 | 0.10 | 0.10 | 0.20 | 0.0000 | 0.0150 | 0.0150 | — | 0.00 |
| Invention Example | 21 | 20.00 | 15.00 | 0.10 | 0.10 | 0.20 | 0.0000 | 0.0001 | 0.0001 | — | 0.00 |
| Invention Example | 22 | 22.00 | 8.00 | 0.10 | 0.10 | 0.20 | 0.0300 | 0.0100 | 0.0400 | Sn: 0.02 | 0.02 |
| Comparative Example | 23 | 22.00 | 8.00 | 0.20 | 0.00 | 0.10 | 0.0030 | 0.0020 | 0.0050 | — | 0.00 |
| Invention Example | 24 | 24.00 | 8.00 | 0.10 | 0.00 | 0.10 | 0.0042 | 0.0030 | 0.0072 | Mn: 0.10 | 0.10 |
| Comparative Example | 25 | 27.00 | 10.00 | 2.50 | 0.00 | 0.10 | 0.0042 | 0.0041 | 0.0083 | — | 0.00 |
| Invention Example | 26 | 28.00 | 8.00 | 0.10 | 0.10 | 0.10 | 0.0050 | 0.0012 | 0.0062 | — | 0.00 |
| Invention Example | 27 | 30.00 | 10.00 | 0.10 | 0.30 | 0.30 | 0.0039 | 0.0032 | 0.0071 | Cu: 0.10 | 0.10 |
| Invention Example | 28 | 32.00 | 10.00 | 0.10 | 0.60 | 0.50 | 0.0023 | 0.0042 | 0.0065 | Sr: 0.02 | 0.02 |
| Invention Example | 29 | 35.00 | 10.00 | 0.10 | 1.00 | 0.70 | 0.0010 | 0.0031 | 0.0041 | — | 0.00 |
| Comparative Example | 30 | 37.00 | 4.00 | 0.20 | 0.00 | 0.80 | 0.0001 | 0.0001 | 0.0002 | — | 0.00 |

TABLE 2

| No. | Plating Bath Temperature (° C.) | Plating Bath Dipping Time (sec) | Average Cooling Rate From Bath Temperature to Controlled Cooling Stop Temperature (° C./s) | Controlled Cooling Stop Temperature (° C.) | Average Cooling Rate From Controlled Cooling Stop Temperature to 335° C. (° C./s) | Al—ZN Dendrite (area %) | (Al, Zn)MgZn₂ Lamellar Structure Area Ratio (area %) | (Al, Zn)MgZn₂ Lamellar Structure Lamellan Spacing (nm) | Massive MgZn₂ (area %) | Zn/Al/ MgZn₂ Ternary Eutectic Structure (area %) | Other Inter-metallic Compounds (area %) | Post-Coating Corrosion Resistance | LME Resistance |
|---|---|---|---|---|---|---|---|---|---|---|---|---|---|
| 1 | 440 | 3 | 15 | 335 | 5 | 5 | 0 | — | 15 | 80.0 | 0.0 | B | A |
| 2 | 410 | 3 | 15 | 360 | 5 | 5 | 10 | 420 | 5 | 79.5 | 0.5 | A | A |
| 3 | 450 | 3 | 15 | 380 | 5 | 5 | 35 | 480 | 5 | 54.6 | 0.4 | A | A |
| 4 | 470 | 3 | 15 | 380 | 5 | 36 | 0 | — | 0 | 63.4 | 0.6 | B | A |
| 5 | 500 | 3 | 15 | 410 | 5 | 6 | 37 | 430 | 5 | 51.6 | 0.4 | A | A |
| 6 | 460 | 3 | 15 | 380 | 15 | 37 | 0 | — | 30 | 32.4 | 0.6 | B | A |
| 7 | 470 | 3 | 20 | 420 | 5 | 0 | 60 | 500 | 4 | 35.2 | 0.8 | A | AA |
| 8 | 470 | 3 | 20 | 420 | 5 | 0 | 60 | 500 | 4 | 35.2 | 0.8 | A | AA |
| 9 | 470 | 3 | 20 | 410 | 5 | 6 | 65 | 440 | 5 | 23.9 | 0.1 | AA | AA |
| 10 | 470 | 3 | 20 | 410 | 5 | 10 | 67 | 470 | 4 | 18.8 | 0.3 | AA | AA |
| 11 | 480 | 3 | 20 | 420 | 5 | 10 | 25 | 480 | 43 | 21.7 | 0.3 | B | A |
| 12 | 480 | 3 | 20 | 420 | 5 | 0 | 72 | 480 | 4 | 23.9 | 0.1 | AA | AA |
| 13 | 480 | 3 | 20 | 420 | 5 | 9 | 59 | 500 | 0 | 31.6 | 0.4 | A | A |
| 14 | 480 | 3 | 20 | 420 | 5 | 9 | 59 | 500 | 0 | 31.6 | 0.4 | A | A |
| 15 | 480 | 3 | 20 | 420 | 5 | 6 | 82 | 300 | 4 | 6.8 | 1.2 | AAA | AA |
| 16 | 480 | 3 | 20 | 420 | 5 | 0 | 65 | 360 | 15 | 19.7 | 0.3 | AA | AA |
| 17 | 500 | 3 | 20 | 395 | 5 | 10 | 63 | 500 | 0 | 21.5 | 5.5 | AA | A |
| 18 | 500 | 3 | 20 | 440 | 5 | 53 | 8 | 330 | 27 | 11.3 | 0.7 | B | AA |
| 19 | 540 | 3 | 20 | 440 | 5 | 4 | 90 | 280 | 3 | 0.9 | 2.1 | AAA | AA |
| 20 | 510 | 3 | 20 | 450 | 5 | 0 | 70 | 400 | 20 | 9.3 | 0.7 | AA | AA |
| 21 | 510 | 3 | 20 | 450 | 5 | 0 | 70 | 400 | 20 | 9.3 | 0.7 | AA | AA |
| 22 | 510 | 3 | 20 | 450 | 5 | 9 | 80 | 290 | 5 | 3.8 | 2.2 | AAA | AA |
| 23 | 510 | 3 | 5 | 450 | 5 | 18 | 38 | 660 | 28 | 15.5 | 0.5 | B | AA |
| 24 | 515 | 3 | 20 | 450 | 5 | 8 | 73 | 350 | 0 | 17.1 | 1.9 | AA | AA |
| 25 | 510 | 3 | 20 | 455 | 5 | 15 | 44 | 650 | 18 | 13.0 | 10.0 | B | AA |
| 26 | 510 | 3 | 20 | 455 | 5 | 8 | 78 | 450 | 5 | 7.7 | 1.3 | AA | AA |
| 27 | 510 | 3 | 20 | 460 | 5 | 4 | 86 | 280 | 0 | 4.0 | 6.0 | AAA | AA |
| 28 | 520 | 3 | 20 | 470 | 5 | 6 | 90 | 250 | 0 | 0.0 | 4.0 | AAA | AA |
| 29 | 540 | 3 | 20 | 480 | 5 | 10 | 84 | 260 | 0 | 0.0 | 6.0 | AAA | AA |
| 30 | 580 | 3 | 20 | 490 | 5 | 76 | 9 | 550 | 5 | 10.0 | 0.0 | B | A |

As can be seen from Tables 1 and 2, excellent post-coating corrosion resistance was obtained in Nos. 2, 3, 5, 7 to 10, 12 to 17, 19 to 22, 24, and 26 to 29 according to the Invention Examples.

On the other hand, in No 1, 4, 6, 11, 18, 23, 25, and 30 according to the Comparative Examples, the chemical compositions of the plating layers and the configurations of the, structures in the surfaces of the plating layers were outside the range of the present invention, and thus post-coating corrosion resistance was poor.

INDUSTRIAL APPLICABILTY

According to the present invention, plated steel having higher post-coating corrosion resistance than a plated steel sheet for a vehicle in the related art can be provided, and the service lite of a plated steel sheet for a vehicle can be increased, which can contribute to the development of the industry.

BRIEF DESCRIPTION OF THE REFERENCE SYMBOLS

1: lamellar structure of (Al—Zn) phase and MgZn₂ phase
2: (Al—Zn) dendrite
3: Zn/Al/MgZn₂ ternary eutectic structure

The invention claimed is:
1. A plated steel sheet comprising:
a steel sheet; and
a plating layer that is formed on at least a part of a surface of the steel sheet,
wherein a chemical composition of the plating layer includes, by mass%,
Al: 6.00% to 35.00%,
Mg: 3.00% to 15.00%,
La+Ce: 0.0001% to 0.5000% in total,
Si: 0% to 2.00%,
Ca: 0% to 2.00%,
Fe: 0% to 2.00%,
Sb: 0% to 0.50%,
Sr: 0% to 0.50%,
Pb: 0% to 0.50%,
Sn: 0% to 1.00%,
Cu: 0% to 1.00%,
Ti: 0% to 1.00%,
Ni: 0% to 1.00%,
Mn: 0% to 1.00%, and
a remainder of Zn and impurities, and
in a surface of the plating layer,
an area ratio of a lamellar structure in which an (Al—Zn) phase and a MgZn₂ phase are arranged in layers is 10% to 95%,
a lamellar spacing of the lamellar structure is 2.5 μm or less, and an area ratio of an (Al—Zn) dendrite is 10% or less.

2. The plated steel sheet according to claim 1,
wherein the chemical composition of the plating layer includes, by mass %, one or more kinds among
Al: 11.00% to 30.00%,
Mg: 5.00% to 11.00%, and
La+Ce: 0.0010% to 0.1000% in total.

3. The plated steel sheet according to claim 2,
wherein in the surface of the plating layer, the area ratio of the lamellar structure is 60% to 95%.

4. The plated steel sheet according to claim 3,
wherein in the surface of the plating layer, the area ratio of the lamellar structure is 80% to 95%.

5. The plated steel sheet according to claim 1,
wherein in the surface of the plating layer, the area ratio of the lamellar structure is 60% to 95%.

6. The plated steel sheet according to claim 3,
wherein in the surface of the plating layer, the area ratio of the lamellar structure is 80% to 95%.

* * * * *